United States Patent
Fontaine et al.

(10) Patent No.: US 10,073,221 B2
(45) Date of Patent: Sep. 11, 2018

(54) BEAMFORMING FOR AN OPTICAL SWITCH

(71) Applicant: Alcatel-Lucent USA Inc., Murray Hill, NJ (US)

(72) Inventors: Nicolas K. Fontaine, Aberdeen, NJ (US); David T. Neilson, Oldbridge, NJ (US); Roland Ryf, Aberdeen, NJ (US)

(73) Assignee: NOKIA OF AMERICA CORPORATION, Murry Hill, NJ (US)

( * ) Notice: Subject to any disclaimer, the term of this patent is extended or adjusted under 35 U.S.C. 154(b) by 0 days.

(21) Appl. No.: 15/277,322

(22) Filed: Sep. 27, 2016

(65) Prior Publication Data

US 2017/0090124 A1   Mar. 30, 2017

Related U.S. Application Data (60) Provisional application No. 62/235,193, filed on Sep. 30, 2015.

(51) Int. Cl.
*G02B 6/26* (2006.01)
*G02B 6/35* (2006.01)
(Continued)

(52) U.S. Cl.
CPC ....... *G02B 6/3588* (2013.01); *G02B 6/29304* (2013.01); *G02B 6/356* (2013.01); *G02B 6/3518* (2013.01); *G02B 27/0927* (2013.01)

(58) Field of Classification Search
None
See application file for complete search history.

(56) References Cited

U.S. PATENT DOCUMENTS 3,670,260 A   6/1972   Koester et al.
4,475,027 A   10/1984   Pressley
(Continued)

FOREIGN PATENT DOCUMENTS

WO   2012047087 A1   4/2012

OTHER PUBLICATIONS

Syms, Richard R. A., "Scaling Laws for MEMS Mirror-Rotation Optical Cross Connect Switches," Journal of Lightwave Technology, vol. 20, No. 7, 2002, pp. 1084-1094.
(Continued)

*Primary Examiner* — Sung Pak
(74) *Attorney, Agent, or Firm* — Mendelsohn Dunleavy, P.C.; Yuri Gruzdkov (57) ABSTRACT

Disclosed herein are various embodiments of an optical cross-connect switch in which optical beamforming is used to generate desired (e.g., technically beneficial) beam profiles at the beam-steering element of the switch. An example beam profile that can be generated in this manner is a substantially rectangular beam profile generated from an input optical beam having a substantially Gaussian beam profile. The use of rectangular beam profiles may be beneficial because such beam profiles can be used to increase the optical fill factor of the beam-steering element of the switch, thereby enabling the switch to have a higher number of optical ports and/or a lower cost per optical port than comparable conventional optical cross-connect switches. In an example embodiment, the disclosed optical cross-connect switch can be used to implement a wavelength-selective optical router.

18 Claims, 7 Drawing Sheets

(51) Int. Cl.
*G02B 27/09* (2006.01)
*G02B 6/293* (2006.01)

(56) References Cited

U.S. PATENT DOCUMENTS

| | | | | |
|---|---|---|---|---|
| 6,263,123 | B1* | 7/2001 | Bishop | G02B 6/266 |
| | | | | 385/15 |
| 6,870,682 | B1 | 3/2005 | Grenier et al. | |
| 7,729,574 | B2 | 6/2010 | Moriarty | |
| 7,769,255 | B2 | 8/2010 | Nagy et al. | |
| 8,699,024 | B2* | 4/2014 | Colbourne | G02B 27/4244 |
| | | | | 356/300 |
| 9,654,848 | B2* | 5/2017 | Frisken | G02B 6/3512 |
| 2004/0141683 | A1 | 7/2004 | Hsu | |
| 2005/0074204 | A1* | 4/2005 | Wilson | G02B 6/2931 |
| | | | | 385/24 |
| 2014/0118811 | A1* | 5/2014 | Morizur | G02F 1/0121 |
| | | | | 359/239 |
| 2015/0077860 | A1* | 3/2015 | Pochy | G02B 27/0955 |
| | | | | 359/708 |
| 2015/0078748 | A1 | 3/2015 | Tazawa et al. | |
| 2015/0180603 | A1 | 6/2015 | Darling et al. | |

OTHER PUBLICATIONS

"Programmable Unitary Spatial Modes Manipulation," www.academia.edu, year [retrieved on Sep. 25, 2015] Retrieved from the Internet: <URL: http://www.academia.edu/1514640/Programmable_unitary_spatial_modes_manipulation> (19 pages).

Labroille, Guillaume, et al., "Efficient and Mode Selective Spatial Mode Multiplexer Based on Multi-Plane Light Conversion," Optics Express, 2014, vol. 22, No. 13, pp. 15599-15607.

"Multi-Plane Light Conversion," www.cailabs.com, 2015, as retrieved on Jan. 12, 2018 from: http://www.cailabs.com/technology/, 2 pages.

Borevich, Z. I., et al., "Subgroups of the unitary group that contain the group of diagonal matrices." Journal of Soviet Mathematics 17.4 (1981), pp. 1951-1959.

"Coherent Transfer Function, Fourier Transform," www.telescope-optics.net, 2015 [retrieved on Sep. 15, 2015] Retrieved from the Internet: <URL: http://www.telescope-optics.net/mtf2.htm> (10 pages).

Jarrahi, Mona et al., "Optical switching based on high-speed phased array optical beam steering," Applied Physics Letters vol. 92, No. 1, 2008, (3 pages).

"Optical Design of Laser Beam Shaping Systems," http://people.cas.uab.edu, 2002 [retrieved on Sep. 15, 2015] Retrieved from the Internet: <URL: http://people.cas.uab.edu/~dls/presentations/IODC-IWA2.pdf> (31 pages).

Tan, Kim L. et al., "Dynamic holography for optical interconnections. II. Routing holograms with predictable location and intensity of each diffraction order," Optical Society of America, vol. 18, No. 1, 2001, pp. 205-215.

"Design, optimization, and characterization of multi-beam optical systems," http://www.ira.inaf.it, 2013 [retrieved on Sep. 15, 2015] Retrieved from the Internet: <URL: http://www.ira.inaf.it/eratec/PresentationOct2013/multi-beam-sandri.pdf> (27 pages).

Thomas, James a. et al., "Programmable diffractive optical element using a multichannel lanthanum-modified lead zirconate titanate phase modulator," Optics Letters, vol. 20, No. 13, 1995, pp. 1510-1512.

"Programmable Unitary Spatial Modes Manipulation," www.academia.edu, 2010 [retrieved on Sep. 25, 2015] Retrieved from the Internet: <URL: http://www.academia.edu/1514640/Programmable_unitary_spatial_modes_manipulation> (19 pages).

* cited by examiner

BEAMFORMING FOR AN OPTICAL SWITCH

CROSS-REFERENCE TO RELATED APPLICATIONS

This application claims the benefit of U.S. Provisional Patent Application No. 62/235,193 filed on Sep. 30, 2015, and entitled "BEAMFORMING FOR AN OPTICAL SWITCH," which is incorporated herein by reference in its entirety.

BACKGROUND

Field

The present disclosure relates to optical communication equipment and, more specifically but not exclusively, to optical switches.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical cross-connect (OXC) switch is an optical device that is used, e.g., by telecommunications carriers, to switch optical signals in a fiber-optic network. A representative N×M OXC switch interconnects any of its N optical input ports to any of its M optical output ports in an optically transparent fashion. A wavelength-selective switch (WSS) is an OXC switch that operates on wavelength-division-multiplexed (WDM) signals without having to fully physically de-multiplex their constituent WDM components, e.g., into individual dedicated ports. A WSS can be used, for example, to implement a reconfigurable optical add/drop multiplexer (ROADM). Currently, there is a high market demand for OXC switches, WSSs, and ROADMs that have one or more, and possibly all, of the following characteristics: (i) low production cost; (ii) small form factor; (iii) high port count; (iv) high switching speed; and (v) low insertion loss.

SUMMARY OF SOME SPECIFIC EMBODIMENTS

Disclosed herein are various embodiments of an optical cross-connect switch in which optical beamforming is used to generate desired (e.g., technically beneficial) beam profiles at the beam-steering element of the switch. An example beam profile that can be generated in this manner is a substantially rectangular beam profile generated from an input optical beam having a substantially Gaussian beam profile. The use of rectangular beam profiles may be beneficial because such beam profiles can be used to increase the optical fill factor of the beam-steering element of the switch, thereby enabling the switch to have a higher number of optical ports and/or a lower cost per optical port than comparable conventional optical cross-connect switches.

In an example embodiment, the disclosed optical cross-connect switch can be used to implement a wavelength-selective optical router.

According to an example embodiment, provided is an apparatus comprising: an array of optical ports; a beam-steering device optically coupled to the array of optical ports and having a beam-steering surface that comprises a plurality of configurable pixels; and a beam transformer interposed between the array of optical ports and the beam-steering surface, wherein the beam transformer comprises a plurality of optical elements optically coupled to each other and located between a first side of the beam transformer and a second side of the beam transformer and configured to interconvert a first electromagnetic-field pattern of the first side and a second electromagnetic-field pattern of the second side, the first side facing the array of optical ports and the second side facing the beam-steering surface; and wherein the plurality of optical elements are further configured to cause the first electromagnetic-field pattern and the second electromagnetic-field pattern to have different relative amounts of spatial overlap between optical beams corresponding to at least one pair of optical ports of the array of optical ports.

According to another example embodiment, provided is an apparatus comprising: an array of optical ports; a beam-steering device optically coupled to the array of optical ports and having a beam-steering surface; and a beam transformer interposed between the array of optical ports and the beam-steering surface and configured to interconvert a first light beam pattern that includes a collection of substantially Gaussian beam profiles at a first side thereof and a second light beam pattern at a second side thereof, the first side facing the array of optical ports and the second side facing the beam-steering surface; and wherein the beam transformer is further configured to cause an inter-conversion between the collection of substantially Gaussian beam profiles at the first side and a collection of substantially rectangular beam profiles at the beam-steering device by way of the second light beam pattern at the second side.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
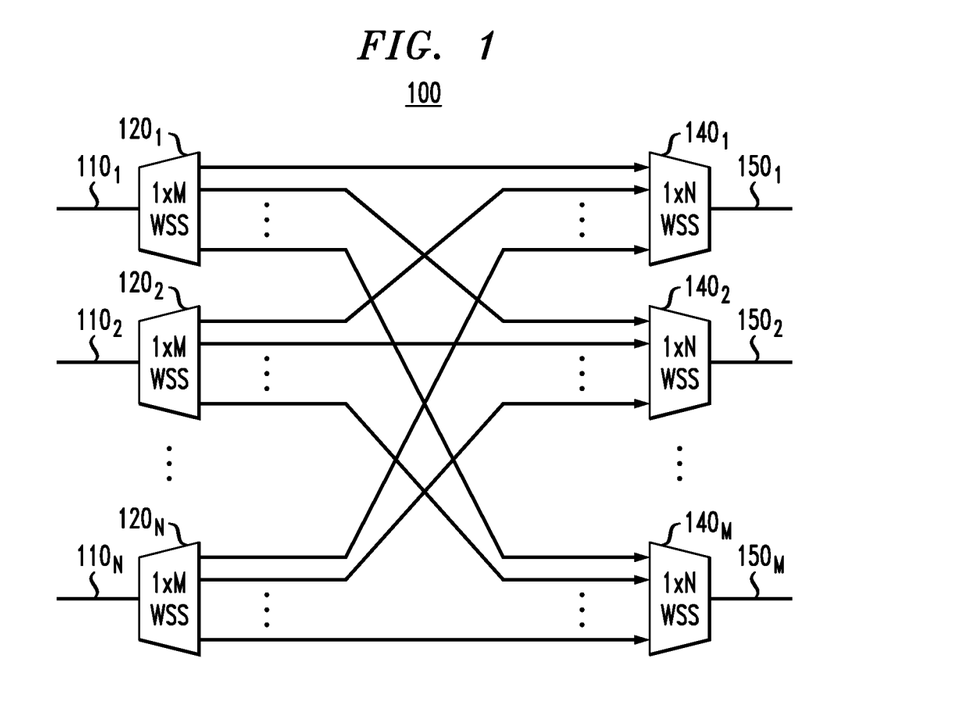
FIG. 1 shows a block diagram of a wavelength-selective-switch (WSS) device according to an embodiment.

FIG. 1 shows a block diagram of a wavelength-selective-switch (WSS) device 100 according to an embodiment of the disclosure. Device 100 has N input ports $110_1$-$110_N$ and M output ports $150_1$-$150_M$, where N and M are (either the same or different) integers greater than one. After device 100 is deployed, each of input ports 110 and output ports 150 may have a respective optical fiber (not explicitly shown in FIG. 1) connected to it. In operation, each of these optical fibers is configured to transport a respective optical WDM signal. In principle, each of the transported WDM signals can have an arbitrary number of WDM components (modulated carrier wavelengths), with the total number K of unique carrier wavelengths that are being handled by device 100 being independent of N and/or M.

Device 100 comprises N (1×M) wavelength-selective switches 120$_1$-120$_N$ and M (1×N) wavelength-selective switches 140$_1$-140$_M$, interconnected as shown in FIG. 1. A 1×N wavelength-selective switch is typically a (re)configurable optical multiplexer/de-multiplexer that can be configured to route the full set of or a selected subset of the K carrier wavelengths between its common port and a variety of its N ports. As used herein, the term "common port" refers to a port having the following features of a 1×N wavelength-selective switch. When an input port, a common port can be configured to variously distribute the received carrier wavelengths among the N ports such that different ones of the N ports internally receive and externally output different non-overlapping subsets of the K carrier wavelengths. One of these possible configurations can be such that all wavelengths externally applied to the common port go to a single one of the N ports while others of the N ports receive no carrier wavelengths from the common port. When an output port, a common port can internally collect and externally output up to K carrier wavelengths from the different N ports such that different ones of the N ports contribute different non-overlapping subsets of the K wavelengths. Again, one of these possible configurations can be such that all carrier wavelengths collected by the common port originate from a single one of the N ports while other ones of the N ports contribute no carrier wavelengths to the common port. It is customary to depict a 1×N WSS using a block diagram in which (i) the common port is shown at the side having a single port (see FIG. 1) and (ii) each of the N ports is shown as being located at the side having the N ports (also see FIG. 1), but the actual physical locations of the N+1 ports of such a 1×N WSS may be different. For example, in device 100, each wavelength-selective switch 120$_i$ has its common port optically coupled to the corresponding input port 110$_i$. Similarly, each wavelength-selective switch 140$_i$ has its common port optically coupled to the corresponding output port 150$_i$. The M ports of the 1×M wavelength-selective switches 120$_1$-120$_N$ are optically coupled to the N ports of the 1×N wavelength-selective switches 140$_1$-140$_M$ as indicated in FIG. 1. The latter connections can be implemented through free space, e.g., with mirrors and lenses, or through optical fibers or waveguides.

Each 1×M wavelength-selective switch 120 is configured to operate as a configurable de-multiplexer that routes optical signals from the common input port to various ones of the M output ports. Each 1×N wavelength-selective switch 140 is configured to operate as a configurable multiplexer that routes optical signals from various ones of the N input ports to the common output port. Using the routing characteristics of wavelength-selective switches 120 and 140, device 100 is capable of directing any carrier wavelength or any set of two or more carrier wavelengths from any input port 110 to any output port 150. In operation, device 100 may employ a switch controller (not explicitly shown in FIG. 1) that is operatively connected to control the routing configurations of the 1×M and 1×N wavelength-selective switches 120$_1$-120$_N$ and 140$_1$-140$_M$. The controller may use appropriate routing algorithms, e.g., to avoid signal collisions at any of output ports 150$_1$-150$_M$, with a collision being an event in which two different optical signals having the same carrier wavelength arrive simultaneously at the same output port 150.

Example embodiments of wavelength-selective switches that can be used as wavelength-selective switches 120 and 140 in device 100 are described in more detail below in reference to FIGS. 2-7. From the provided description, a person of ordinary skill in art will understand that an example embodiment of a wavelength-selective switch disclosed herein advantageously enables WSS device 100 to have a relatively high port count and/or a relatively low cost per port. These and other benefits can be obtained, e.g., due to a relatively efficient use of the active area of the beam-steering element in each of the disclosed wavelength-selective switches enabled by the use of beamforming therein.

Figure 2:
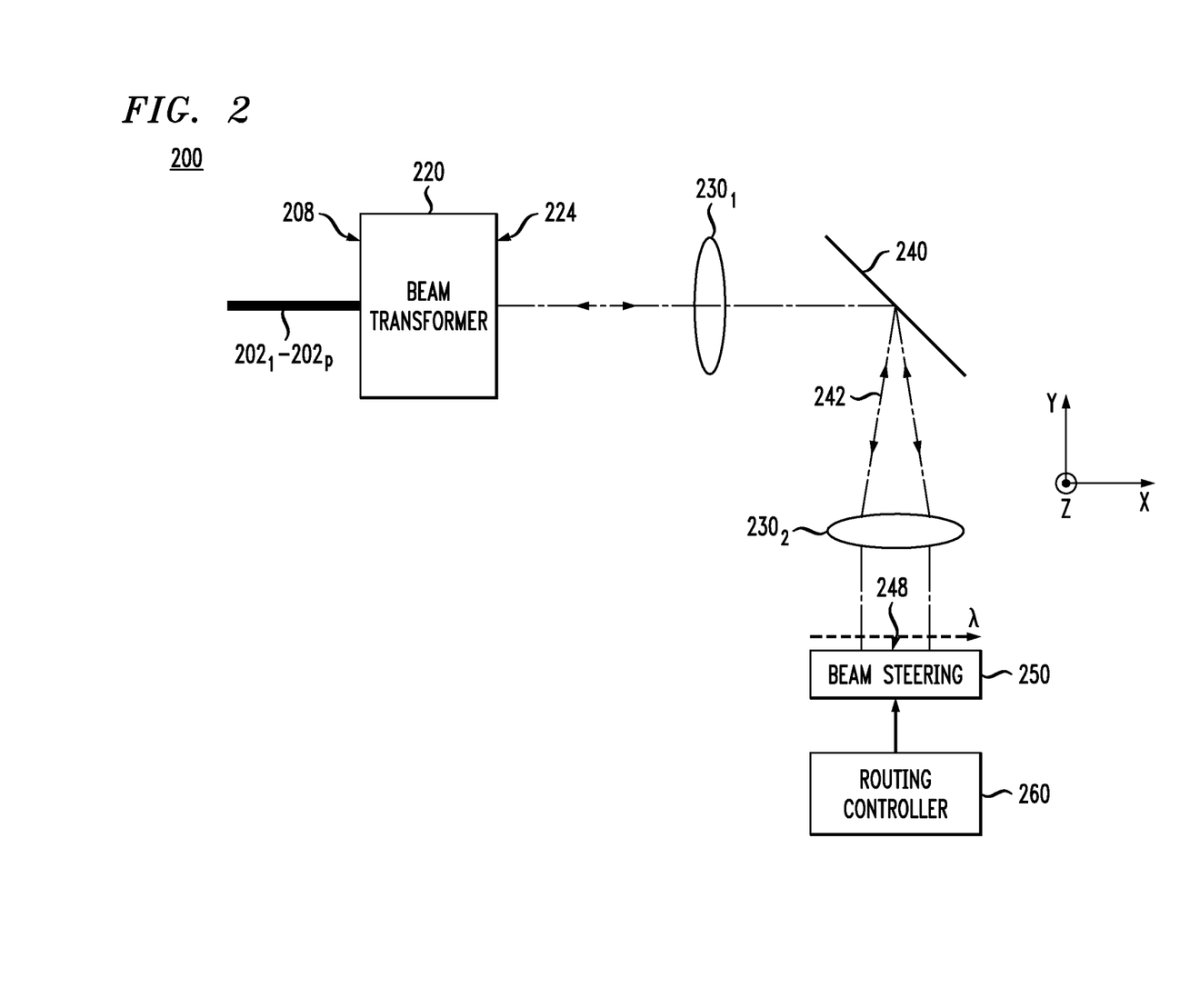
FIG. 2 shows a block diagram of a wavelength-selective switch that can be used in the WSS device of FIG. 1 according to an embodiment.

FIG. 2 shows a block diagram of a wavelength-selective switch 200 that can be used in the WSS device 100 (FIG. 1) according to an embodiment. Device 200 has a total of P optical ports 202$_1$-202$_P$, where P is an integer greater than two. One of ports 202$_1$-202$_P$ is configured to operate as a common port. Some or all of the remaining ports 202$_1$-202$_P$ are configured to operate as the M or N ports. In some embodiments, one or more of ports 202$_1$-202$_P$ may be idle. An embodiment of switch 200 having P≥M+1 ports can be used, e.g., as a wavelength-selective switch 120 (FIG. 1). An embodiment of switch 200 having P≥N+1 ports can be used, e.g., as a wavelength-selective switch 140 (FIG. 1).

In the embodiment shown in FIG. 2, ports 202$_1$-202$_P$ are arranged, e.g., in a regularly space or irregularly spaced, linear array lined up parallel to the Z-coordinate axis at a backside 208 of a beam transformer 220. As a result, the P ports 202$_1$-202$_P$ appear stacked on top of one another in the projection shown in FIG. 2. In an example embodiment, an optical port 202 may include a length of optical fiber or waveguide and/or a fiber connector for connecting an external optical fiber. In operation, an optical port 202 may be configured to receive a respective optical WDM signal either from an external link of from the interior of device 200.

In an alternative embodiment (not shown), ports 202 can be arranged at backside 208 in a regular or irregular two-dimensional array.

Figure 3:
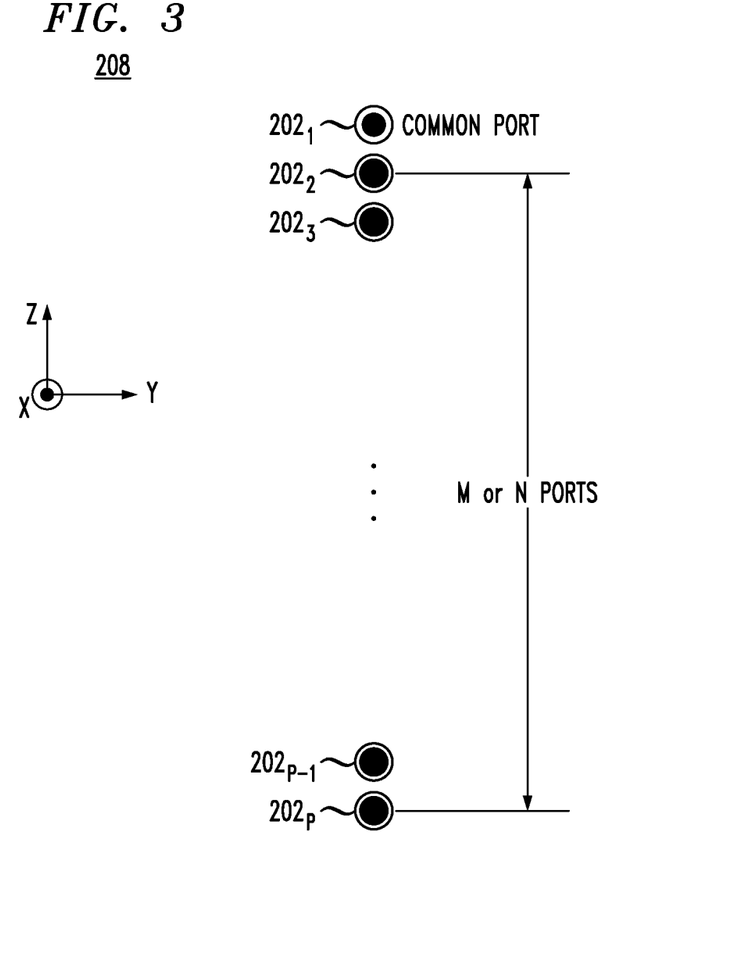
FIG. 3 shows an example arrangement of optical ports in the wavelength-selective switch of FIG. 2 according to an embodiment.

FIG. 3 shows a view of backside 208 along the X-coordinate axis according to an embodiment. In this particular embodiment, the P similar optical ports 202$_1$-202$_P$ are arranged in a regularly spaced, linear array oriented parallel to the Z-coordinate axis. Optical port 202$_1$ is configured to operate as the common port.

In some embodiments, backside 208 may also have a plurality of lenses (not explicitly shown in FIG. 3) arranged in a linear array that generally matches the shown array of optical ports 202 and contains, e.g., at least, one lens per optical port. The lenses may be used, e.g., to appropriately couple (e.g., with relatively low losses) optical ports 202$_1$-202$_P$ and internal optical elements (not explicitly shown in FIG. 2; see, e.g., FIG. 5) of beam transformer 220.

Referring back to FIG. 2, in an example embodiment, beam transformer 220 operates to transform light beams between backside 208 and a front side 224 thereof in a manner that tends to (i) minimize overall optical insertion losses of wavelength-selective switch 200 and (ii) optimize the illumination of a front side (e.g., the active beam-steering area) 248 of a beam-steering device 250 used in the switch, e.g., as further described below. In general, beam transformer 220 may be configured to perform a transformation of the beam's electromagnetic field that has one or more of the following characteristics: (i) causes backside 208 and front side 224 to have different phase patterns of the electromagnetic field, with the difference being of the type that can NOT be obtained by any combination of magnification/de-magnification, amplification/attenuation, and/or application of a uniform phase shift; (ii) causes backside 208 and front side 224 to have different respective intensity distributions, with the difference being of the type that cannot be obtained by a magnification or de-magnification and/or amplification or attenuation; (iii) causes backside 208 and front side 224 to have different relative amounts of spatial overlap between the beams corresponding to different optical ports 202; (iv) inter-converts spatially separated, substantially non-overlapping set of beams at backside 208 and a spatially orthogonal set of beams that have non-negligible spatial overlap at front side 224; (v) performs the transformation in a single (e.g., Z) dimension transverse to the beam, without transforming the beam profiles in the orthogonal (e.g., Y) dimension, or performs the transformation differently in two orthogonal (e.g., both Y and Z) dimensions, which are transverse to the beam; and (vi) creates beams with different profiles, e.g., a first beam-profile type for a first subset of beams and a second different beam-profile type for a second subset of beams.

As used herein, the term "spatial overlap" refers to an area of backside 208 or front side 224 that can be quantified using the following example steps: (i) apply a light beam to optical port $202_i$; (ii) determine a contiguous geometric area $S_{i,b}$ on backside 208 that contains a first fixed predetermined percentage of the optical power projected by the light beam onto the backside; (iii) determine a contiguous geometric area $S_{i,f}$ on front side 224 that contains the first fixed predetermined percentage of the optical power projected by the light beam onto the front side; (iv) repeat steps (i)-(iii) for optical port $202_j$ (j≠i) to determine the corresponding contiguous geometric areas $S_{j,b}$ and $S_{j,f}$; (v) determine the geometric area $C_{ij,b}$ of the spatial overlap between the geometric areas $S_{i,b}$ and $S_{j,b}$; (vi) determine the geometric area $G_{ij,f}$ of the spatial overlap between the geometric areas $S_{i,f}$ and $S_{j,f}$; and (vii) compare the relative amounts of spatial overlap $R_{ij,b}$ and $R_{ij,f}$ calculated using Eqs. (1)-(2):

$$R_{ij,b} = \frac{C_{ij,b}}{S_{i,b} + S_{j,b}} \tag{1}$$

$$R_{ij,f} = \frac{C_{ij,f}}{S_{i,f} + S_{j,f}} \tag{2}$$

Steps (i)-(vii) can be repeated for different pairs of optical ports $202_i$ and $202_j$ to obtain the corresponding pairs of values $R_{ij,b}$ and $R_{ij,f}$. A person of ordinary skill in the art will understand that nearest-neighbor optical ports (e.g., corresponding to j=i+1) typically have greater amounts of spatial overlap than optical ports that are physically separated from one another in the array of optical ports by at least one other optical port. Beam transformer 220 is deemed to cause the electromagnetic-field patterns at backside 208 and front side 224 to have different relative amounts of spatial overlap between the beams corresponding to optical ports $202_i$ and $202_j$ if the values of $R_{ij,b}$ and $R_{ij,f}$ differ from one another by a second fixed predetermined percentage. In various embodiments, the first fixed predetermined percentage can be selected to be, e.g., 80%, 90%, 95%, or 98%. In various embodiments, the second fixed predetermined percentage can be selected to be, e.g., 2%, 5%, 10%, or 20%.

Herein, a unitary transformation on the combined electric field, E(y, z), of one or more light beams, changes E(y, z) to E'(y, z), and is defined by:

$$E'(y,z) = U(y,z)E(y,z).$$

Here, y and z are orthogonal coordinates transverse to the propagation directions (x in beam transformer 220, FIG. 2) of the one or more light beams.

Figure 4A:
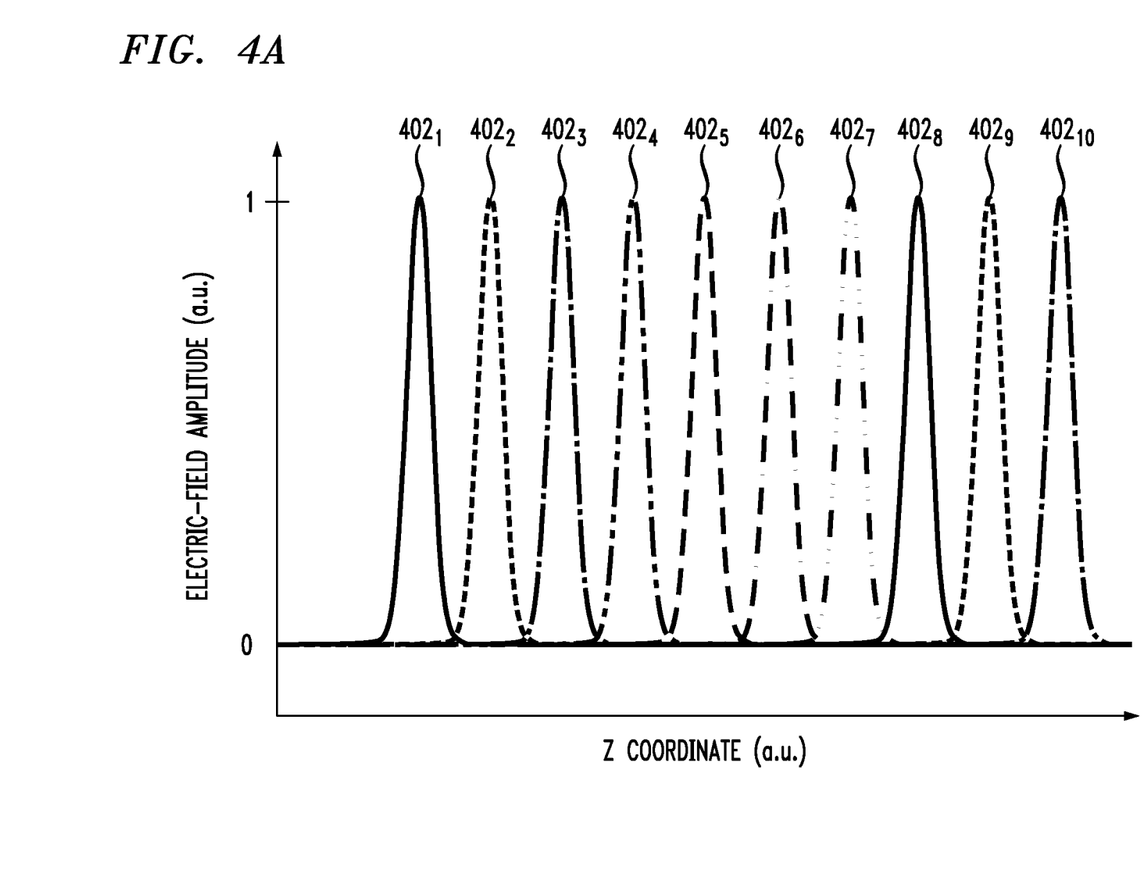
FIGS. 4A-4C graphically illustrate beamforming in the wavelength-selective switch of FIG. 2 according to an embodiment.
Figure 4B:
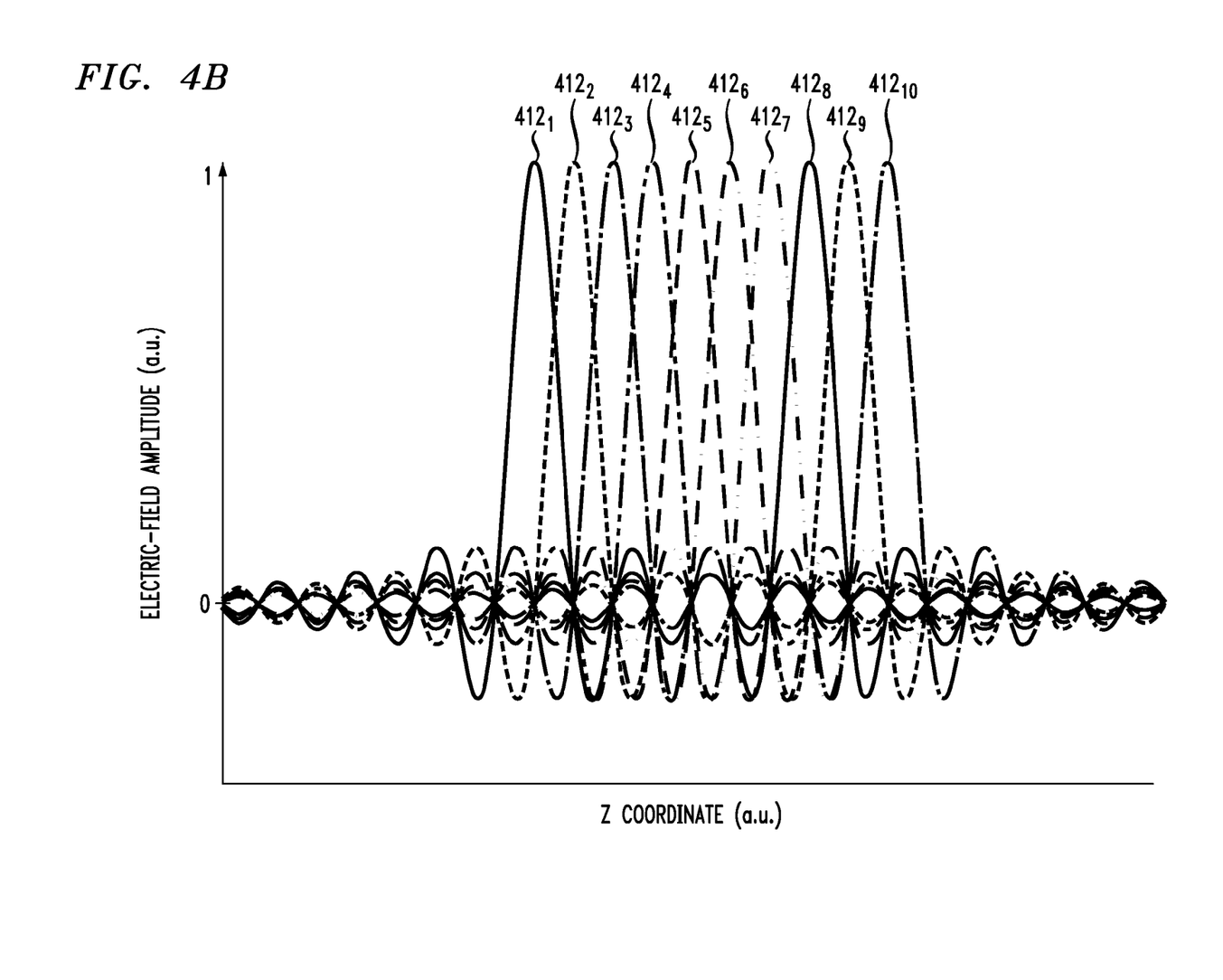

In some embodiments, beam transformer 220 may be configured to apply a unitary transformation to the E-fields of the beams that is anisotropic. An example of such an anisotropic transformation can be mathematically expressed using Eq. (3):

$$U(y,z) = U_1(y)U_2(z) \tag{3}$$

where U(y, z) is the overall transformation applied by beam transformer 220 in the (Y,Z) plane; y is the coordinate along the Y axis; z is the coordinate along the Z axis; $U_1(y)$ is the unitary transformation applied by the beam transformer in the beam-transverse Y dimension; and $U_2(z)$ is the unitary transformation applied by the beam transformer in the beam-transverse Z dimension. Here, $U_2(z) \neq a\ U_1(by+c)$, where a is a real- or complex-valued constant, and b and c are real-valued constants. In some embodiments, $U_1(y)$ is a constant that does not depend on y. An example of $U_2(z)$ is graphically shown and described in reference to FIGS. 4A and 4B.

Figure 4C:
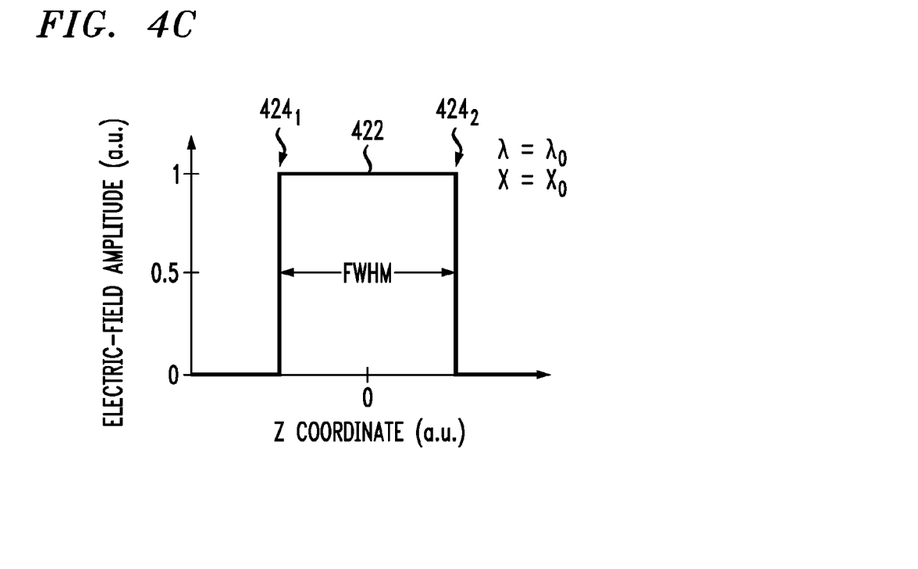

For example, beam transformer 220 may be configured to apply a unitary transformation that causes a resulting optical beam to have relatively sharp edges and relatively uniform intensity at the front side 248 of beam-steering device 250, e.g., as graphically illustrated in FIG. 4C. For comparison, a conventional wavelength-selective switch typically generates an illumination pattern in which the front side of the corresponding beam-steering device receives a plurality of light spots, each having relatively diffuse edges and relatively non-uniform intensity. In addition, the received light spots are typically separated from one another by significant areas on which the front side receives substantially no light. Examples of such a conventional illumination pattern are disclosed, e.g., in U.S. Patent Application Publication Nos. 2015/0078748 and 2015/0180603, both of which are incorporated herein by reference in their entirety. A person of ordinary skill in the art will understand that the conventional illumination pattern of the beam-steering device, in which some portions of the active beam-steering area are brightly lit while adjacent portions of the active beam-steering area receive little light corresponding to the diffuse edges of the bright light spots, may significantly limit the number of spots that can be accommodated by the active beam-steering area, thereby limiting the maximum achievable number P of optical ports in the wavelength-selective switch and/or increasing the cost of the switch per optical port.

Some embodiments of beam transformer 220 are described in more detail below in reference to FIGS. 4-5. Additional embodiments of beam transformer 220 can be implemented, e.g., using multi-plane light converters commercially available from CAILabs of Rennes, France. Further alternative embodiments of beam transformer 220 can be implemented using light converters disclosed, e.g., in U.S. Patent Application Publication No. 2014/0118811, which is incorporated herein by reference in its entirety.

Wavelength-selective switch 200 further includes two sets $230_1$-$230_2$ of relay/imaging/focusing optics configured to appropriately optically couple the various constituent optical elements of the switch, e.g., as further explained below. Although each of optics sets $230_1$-$230_2$ is illustratively shown in FIG. 2 as consisting of a single lens, embodiments of the disclosure are not so limited. In an alternative embodiment, each of optics sets $230_1$-$230_2$ may include any suitable combination of lenses and/or mirrors. Both cylindrical and spherical lenses and/or cylindrical, spherical, and parabolic mirrors may be used. A person of ordinary skill in the art will appreciate that, in some embodiments, device 200 may include one or more additional sets of relay/imaging/focusing optics (not explicitly shown in FIG. 2).

Optics set $230_1$ is positioned between beam transformer 220 and a diffraction grating 240. In an example embodiment, optics set $230_1$ is configured to perform one or more of the following optical functions:

(i) To relay light between beam transformer 220 and diffraction grating 240;

(ii) To change the beam sizes. For example, it might be beneficial to have a larger or smaller beam size for individual optical beams at grating 240 than at front side 224 of beam transformer 220; and (iii) To accommodate dynamic light switching between ports $202_1$-$202_P$ by being a part of an optical imaging system that is configured to image, in a wavelength-dependent manner, each common port onto a corresponding set of other ports, or vice versa. As explained below, another part of said optical imaging system is optics set $230_2$.

Optics set $230_2$ is positioned between diffraction grating 240 and beam-steering device 250. Diffraction grating 240 is configured to angularly disperse the WDM components of each of the optical beams relayed to it from beam transformer 220, e.g., as indicated in FIG. 2 by a light sector 242. Optics set $230_2$ operates to convert the angular dispersion generated by diffraction grating 240 into a spatial separation of the WDM components at front side 248 of beam-steering device 250, whereat the diffracted sub-beams are focused into respective strips of light, with each strip containing light of the corresponding WDM component. A dashed arrow labeled λ indicates in FIG. 2 the direction of the increasing wavelength of the WDM components as they appear at front side 248 of beam-steering device 250. In an example embodiment, front side 248 is located in a Fourier plane of optics sets $230_1$-$230_2$.

In various embodiments, beam-steering device 250 may be implemented using (i) a two-dimensional pixelated MEMS mirror array or (ii) a liquid crystal on silicon (LCOS) micro-display. In a MEMS embodiment of beam-steering device 250, the MEMS mirrors in the array can be controllably tilted to steer the corresponding diffracted sub-beams in the respective intended directions. In an LCOS embodiment of beam-steering device 250, the phase shift imparted onto the corresponding optical beam by the individual pixels of the micro-display can be appropriately controlled to create approximately linear optical phase retardation in the direction of the intended deflection of the diffracted sub-beam. In both embodiments, different portions of front side 248 of beam-steering device 250 can be individually configured, using a routing controller 260, to steer the different diffracted sub-beams impinging onto the beam-steering device in different respective directions.

Optics set $230_2$ further operates to relay the sub-beams variously steered by beam-steering device 250 back to diffraction grating 240. Diffraction grating 240 further operates to directionally recombine each of the subsets of the steered sub-beams (WDM components) intended for the same output port into a respective recombined optical beam and direct each of the recombined optical beams, via optics set $230_1$, to beam transformer 220. Beam transformer 220 then applies the inverse unitary transformation $U^{-1}(y, z)$ to the beams received at front side 224 and couple the resulting transformed optical beams into the respective ones of optical ports $202_1$-$202_P$.

FIGS. 4A-4C graphically illustrate beamforming in wavelength-selective switch 200 (FIG. 2) according to an embodiment. More specifically, the graphs shown in FIGS. 4A-4C correspond to an embodiment of wavelength-selective switch 200 in which P=10. FIG. 4A graphically shows the amplitude of the light's electric field at backside 208 of beam transformer 220 (also see FIGS. 2 and 3). FIG. 4B graphically shows the amplitude of the light's electric field at front side 224 of beam transformer 220 (also see FIG. 2). FIG. 4C schematically illustrates the amplitude of the light's electric field at front side 248 of beam-steering device 250 (also see FIG. 2).

Referring to FIG. 4A, each of bell-shaped curves $402_1$-$402_{10}$ shows the amplitude of the electric field generated by light applied to a respective one of optical ports $202_1$-$202_{10}$. As already indicated above, the light applied to each of optical ports $202_1$-$202_{10}$ may have a single respective carrier wavelength or two or more carrier wavelengths. When a single-mode fiber or waveguide is used in optical port $202_i$, the corresponding bell-shaped curve $402_i$ can be approximated well by a Gaussian function. A person of ordinary skill in the art will understand that a Gaussian function has a single (e.g., positive) lobe approximately centered on the core of the corresponding optical fiber or waveguide. The lateral separation between optical ports $202_1$-$202_{10}$ (see, e.g., FIG. 3) causes curves $402_1$-$402_{10}$ to be well separated from one another, with substantially no spatial overlap between the electric fields corresponding to different optical ports 202.

Referring to FIG. 4B, each of multi-lobe curves $412_1$-$412_{10}$ shows the amplitude of the electric field generated by light corresponding to a respective one of optical ports $202_1$-$202_{10}$ at front side 224 of beam transformer 220. In this particular embodiment, each multi-lobe curve $412_1$ can be approximated by a respective sinc function. A person of ordinary skill in the art will understand that a sinc function has a relatively prominent positive central lobe and a plurality of side lobes of alternating polarity and gradually decreasing magnitude. The unitary transformation $U_2(z)$ (see Eq. (3)) applied by beam transformer 220 in this embodiment thus operates to transform the beam's electric field profile from one approximately described by a Gaussian function into that approximately described by a corresponding sinc function, for light propagating through the beam transformer in the positive X direction (see FIG. 2). Similarly, the inverse unitary transform $U_2^{-1}(z)$ applied by beam transformer 220 to light propagating therethrough in the negative X direction (also see FIG. 2) operates to transform the beam's electric field profile from one approximately described by a sinc function into that approximately described by a corresponding Gaussian function. Also note that these forward and inverse unitary transforms preserve the spectral content of the transformed light. More specifically, for the same i, the light represented by curve $402_i$ (FIG. 4A) and the light represented by curve $412_i$ (FIG. 4B) generally have the same set of carrier wavelengths.

In an example embodiment, the sinc functions 412 corresponding to different optical ports 202 are approximately mutually orthogonal. As used herein, the term "orthogonal" is used in a conventional sense, meaning that an overlap integral over beam-transverse coordinate Z of the product of any two such different sinc functions 412 is approximately zero. A person of ordinary skill in the art will understand that this particular characteristic of the illustrated embodiment of beam transformer 220 may help to reduce inter-channel crosstalk in wavelength-selective switch 200. The phases corresponding to the sinc functions 412 may typically be constant (or "flat").

Referring to FIG. 4C, a curve 422 schematically depicts the amplitude profile of the electric field generated at front side 248 of beam-steering device 250 (also see FIG. 2) by light corresponding to a respective one of optical ports $202_1$-$202_{10}$. Because front side 248 is located in a Fourier plane of optics sets $230_1$-$230_2$, each sinc function 412 is spatially Fourier transformed by the optics into one or more substantially rectangular functions, of which curve 422 is a schematic illustration. In general, for each carrier wavelength of the light corresponding to a sinc function $412_i$, the spectral dispersion of the light introduced by diffraction grating 240 causes one corresponding strip of light (with an electric field profile similar to that described by curve 422) to be generated at the respective coordinate x on front side 248 of beam-steering device 250. For example, the strip of light corresponding to curve 422 shown in FIG. 4C has the carrier wavelength $\lambda_0$, is oriented perpendicular to the X direction, is located at the coordinate $x=x_0$, and extends along the Z direction as indicated in FIG. 4C. The strip of light corresponding to the carrier wavelength $\lambda_1$ (not shown) will have a similar substantially rectangular electric-field profile, but will be located at the coordinate $x=x_1$ that is different from $x_0$, and so on.

As used herein, the term "substantially rectangular" refers to an electric-field profile of an optical beam having one or both of the following two characteristics: (i) the optical power contained within the full width at half maximum (FWHM) of the beam profile is at least 95% of the total optical power of the corresponding cross-section of the optical beam and (ii) the magnitude of the electric field at any coordinate z within the window from −0.45 FWHM to +0.45 FWHM of the beam profile is at least 70% of the maximum magnitude in the beam profile, where z=0 corresponds to the middle of the beam profile (also see FIG. 4C). For comparison, the electric-field profile of a Gaussian optical beam has the following corresponding characteristics: (i) the optical power contained within the FWHM of a Gaussian beam profile is less than 91% of the total optical power of the corresponding cross-section of the optical beam and (ii) the magnitude of the electric field at some coordinates z within the window from −0.45 FWHM to +0.45 FWHM of the beam profile is lower than 60% of the maximum magnitude in the beam profile.

For light steered by beam-steering device 250 back towards front side 224 of beam transformer 220, optics sets $230_1$-$230_2$ perform an inverse Fourier transform, thereby converting an electric-field profile described by a substantially rectangular function analogous to that of curve 422 into a corresponding sinc function 412 (FIG. 2B). Routing controller 260 operates to appropriately configure different areas of beam-steering device 250 corresponding to different carrier wavelengths on front side 248 to optically couple, in a switchable and wavelength-dependent manner, the different areas on the front side 224 of beam transformer 220 corresponding to different sinc functions 412.

A person of ordinary skill in the art will understand that intensity (optical-power) distributions corresponding to curve 422 enable a more-efficient use of the active area of beam-steering device 250, e.g., because these intensity distributions have relatively sharp edges $424_1$ and $424_2$ (see FIG. 4C) and, as such, can be packed relatively tightly together without a wastefully large gap or detrimental overlap between them, e.g., the relatively large gap produced in case of the above-mentioned conventional illumination pattern in which some portions of the active area are brightly lit while adjacent portions of the active area receive little light corresponding to the diffuse edges of the bright light spots. This tight packing can be used, e.g., to configure the active area of the same beam-steering device 250 to accommodate and serve a larger number of optical ports 202 compared to that possible in conventional wavelength-selective switches, in which the light spots generated at the active area typically have Gaussian beam profiles with the concomitant relatively diffuse edges. Since the beam-steering device of the wavelength-selective switch, such as beam-steering device 250 of wavelength-selective switch 200, is typically the most expensive element of the switch, a more efficient use of its active area may also be used to reduce the cost of the switch per optical port.

Figure 5:
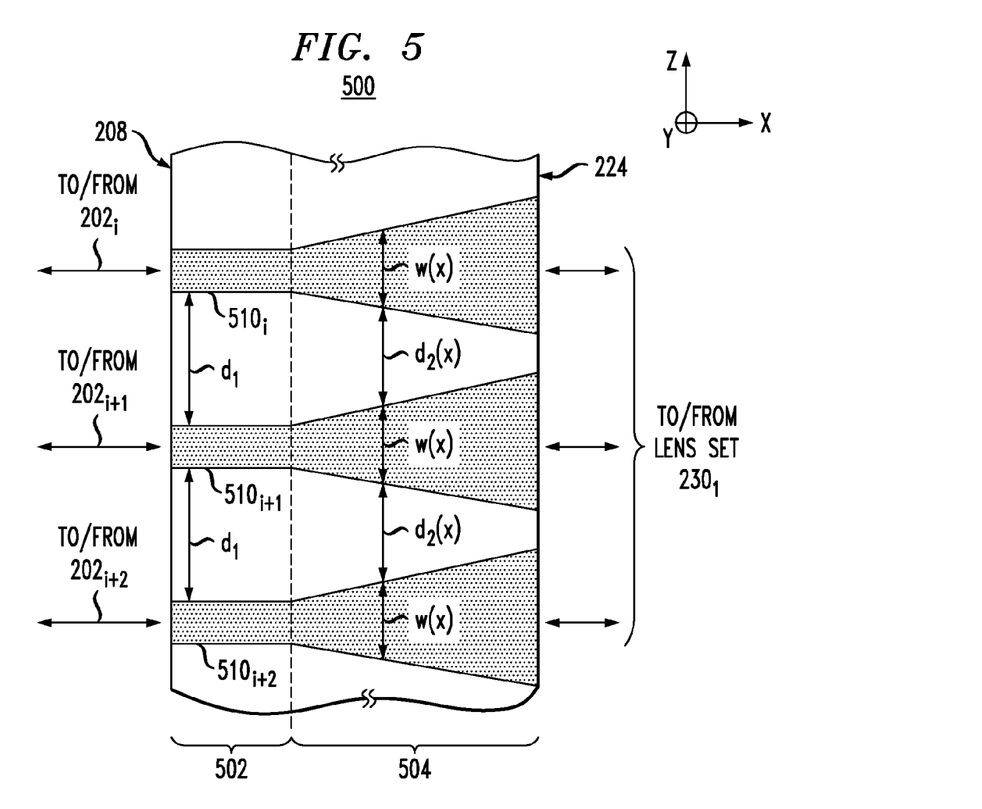
FIG. 5 shows a schematic top view of a planar lightwave circuit (PLC) that can be used in the wavelength-selective switch of FIG. 2 according to an embodiment.

FIG. 5 shows a schematic top view of a planar lightwave circuit (PLC) 500 that can be used in beam transformer 220 (FIG. 2) according to an embodiment. Edges of PLC 500 labeled 208 and 224 in FIG. 5 implement the backside 208 and the front side 224, respectively, of beam transformer 220. PLC 500 comprises a plurality of planar waveguides 510, only three of which, labeled $510_i$, $510_{i+1}$, and $510_{i+2}$, are explicitly shown in FIG. 5. At edge 208, waveguides $510_i$, $510_{i+1}$, and $510_{i+2}$ are optically coupled to optical ports $202_i$, $202_{i+1}$, and $201_{i+2}$, respectively, as indicated in FIG. 5. At edge 224, waveguides $510_i$, $510_{i+1}$, and $510_{i+2}$ are optically coupled to lens set $230_1$ as further indicated in FIG. 5 (also see FIG. 2).

In an area 502 of PLC 500, the cores of waveguides $510_i$, $510_{i+1}$, and $510_{i+2}$ have about constant width and are separated from one another by the constant distance $d_1$. The value of $d_1$ is selected such that there is substantially no evanescent field coupling between the cores of waveguides $510_i$, $510_{i+1}$, and $510_{i+2}$ in area 502.

In an area 504 of PLC 500, the cores of waveguides $510_i$, $510_{i+1}$, and $510_{i+2}$ are characterized by one or both of the following: (i) a variable width w(x) and (ii) a variable distance $d_2(x)$ between the adjacent waveguide cores. The two functions of coordinate X that describe the variable width w(x) and the variable distance $d_2(x)$ are selected such that (i) the amount of evanescent field coupling between the cores of waveguides $510_i$, $510_{i+1}$, and $510_{i+2}$ gradually increases along the positive X direction and (ii) a substantially Gaussian electric field distribution for each of waveguides $510_i$, $510_{i+1}$, and $510_{i+2}$ at edge 208 is transformed into a sinc-like distribution at edge 224, and vice versa.

For example, at edge 208, the electric-field distribution in and around the core of waveguide $510_i$-Fi may be similar to that described by curve $402_5$ (FIG. 4A). In contrast, at edge 224, the electric-field distribution in and around the core of waveguide $510_{i+1}$ may be similar to that described by curve $412_5$ (FIG. 4B). More specifically, the main lobe of this electric-field distribution may be centered on the core of waveguide $510_{i+1}$, whereas the first side lobe to the left of the main lobe and the first side lobe to the right of the main lobe may be centered on the cores of the waveguides $510_i$ and $510_{i+2}$, respectively. As already explained above, the redistribution of the electric field among waveguides $510_i$, $510_{i+1}$, and $510_{i+2}$ is enabled by the evanescent field coupling between the neighboring waveguides in the area 504 of PLC 500.

Figure 6:
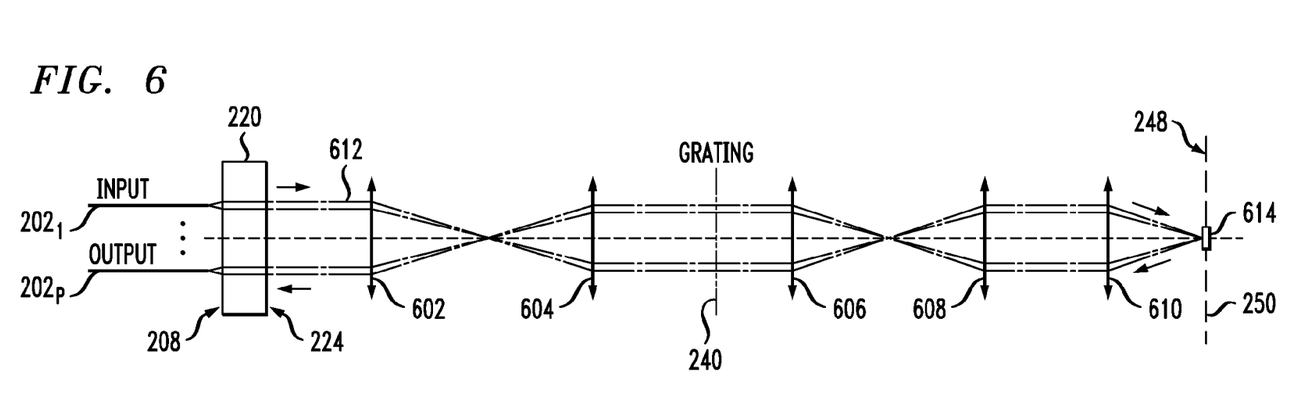
FIGS. 6-7 schematically show optical-beam propagation in two representative routing configurations of the wavelength-selective switch of FIG. 2 according to an embodiment.
Figure 7:
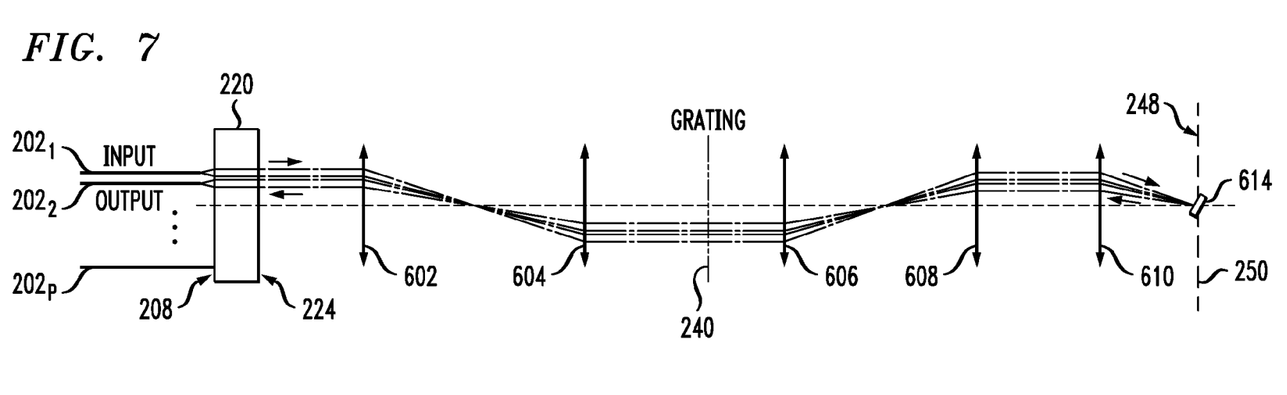

FIGS. 6-7 schematically show optical-beam propagation in two example routing configurations of wavelength-selective switch 200 (FIG. 2) according to an embodiment. The optical port assignment corresponding to FIGS. 6 and 7 is shown in FIG. 3. A comparison of FIGS. 6 and 7 illustrates how beam switching from one of the output ports to another is accomplished. A person of ordinary skill in the art will understand that signal switching for multiple WDM components can be performed in a similar manner using different respective portions of the active area of beam-steering device 250.

In the example shown in FIG. 6, port 202$_1$ is the common port configured to operate as an input port. Beam transformer 220 transforms the electromagnetic field of the light beam received through port 202$_1$, e.g., from a Gaussian-like profile described by curve 402$_1$ (FIG. 4A) to a sinc-like profile described by curve 412$_1$ (FIG. 4B), and directs a resulting shaped optical beam 612 to optics set 230$_1$. Lenses 602 and 604, which are both parts of optics set 230$_1$, operate to image front side 224 of beam transformer 220 onto diffraction grating 240. Lenses 606, 608, and 610, which are all parts of optics set 230$_2$, operate to relay light from diffraction grating 240 to beam-steering device 250. Lens 610 further operates to focus light on front side 248 of beam-steering device 250 to generate thereon light strips having substantially rectangular electric-field profiles similar to that illustrated by curve 422 (see FIG. 4C). A portion 614 of the active surface in beam-steering device 250 is configured to appropriately redirect the received light back toward front side 224 of beam transformer 220 such that, after propagating in the reverse direction through lenses 610, 608, and 606, being diffracted by grating 240, and propagating through lenses 604 and 602, the redirected optical beam impinges onto the portion of front side 224 corresponding to port 202$_P$. Beam transformer 220 then transforms the sinc-like profile of the received optical beam into the corresponding Gaussian-like profile at the backside 208 for efficient coupling into port 202$_P$.

FIG. 7 shows how the propagation path for optical beam 612 changes in device 200 when the intended output port becomes optical port 202$_2$ instead of optical port 202$_P$. More specifically, to change the output port from port 202$_P$ to 202$_2$, portion 614 of the active surface 248 in beam-steering device 250 is reconfigured to redirect the received light back toward front side 224 of beam transformer 220 at a different angle. This angle is such that the redirected optical beam now impinges onto the portion of front side 224 corresponding to optical port 202$_2$ instead of the portion corresponding to optical port 202$_P$. Beam transformer 220 then transforms the sinc-like profile of the received optical beam into the corresponding Gaussian-like profile at the backside 208 for efficient coupling into port 202$_2$.

To further change the output port, routing controller 260 (FIG. 2) may act to reconfigure portion 614 of the active surface in beam-steering device 250 to redirect the received light back toward beam transformer 220 at a different respective angle selected from the range between the angle shown in FIG. 6 and the angle shown in FIG. 7.

According to an example embodiment disclosed above in reference to FIGS. 1-7, provided is an apparatus (e.g., 100, FIG. 1; 200, FIG. 2) comprising: an array of optical ports (e.g., 202$_1$-202$_P$, FIGS. 2-3); a beam-steering device (e.g., 250, FIG. 2) optically coupled to the array of optical ports and having a beam-steering surface (e.g., 248, FIG. 2); and a beam transformer (e.g., 220, FIG. 2) interposed between the array of optical ports and the beam-steering surface and configured to interconvert a first electromagnetic-field pattern (e.g., 402$_i$-402$_{10}$, FIG. 4A) at a first side thereof (e.g., 208, FIG. 2) and a second electromagnetic-field pattern (e.g., 412$_1$-412$_{10}$, FIG. 4B) at a second side thereof (e.g., 224, FIG. 2), the first side facing the array of optical ports and the second side facing the beam-steering surface. The beam transformer is further configured to cause the first electromagnetic-field pattern and the second electromagnetic-field pattern to have different relative amounts of spatial overlap between optical beams corresponding to at least one pair of optical ports of the array of optical ports (e.g., as quantified and explained in reference to Eqs. (1)-(2)).

In some embodiments of the above apparatus, the apparatus further comprises a wavelength-selective optical router (e.g., 200, FIG. 2), wherein the array of optical ports, the beam-steering device, and the beam transformer are parts of the wavelength-selective optical router.

In some embodiments of any of the above apparatus, the apparatus further comprises a diffraction grating (e.g., 240, FIG. 2) interposed between the beam transformer and the beam-steering surface and configured to spectrally disperse light received, through the beam transformer, from the array of optical ports and direct spectrally dispersed light (e.g., 242, FIG. 2) to the beam-steering surface. The beam-steering surface is configurable to individually steer beams corresponding to different carrier wavelengths in the spectrally dispersed light to enable the apparatus to route any of the carrier wavelengths between a first optical port (e.g., 202$_1$, FIG. 3) of the array and any second optical port of a plurality of second optical ports (e.g., 202$_2$-202$_P$, FIG. 3) of the array, the first optical port being a common port and the plurality of second optical ports being other ports of a wavelength-selective optical router (e.g., 200, FIG. 2).

In some embodiments of any of the above apparatus, the diffraction grating is configured to operate in reflection (e.g., as indicated in FIG. 2).

In some embodiments of any of the above apparatus, the diffraction grating is configured to operate in transmission.

In some embodiments of any of the above apparatus, the apparatus further comprises imaging optics (e.g., 230$_1$-230$_2$, FIG. 2) interposed between the second side of the beam transformer and the beam-steering surface of the beam-steering device such that the second side of the beam transformer and the beam-steering surface of the beam-steering device are located in different respective Fourier planes of the imaging optics.

In some embodiments of any of the above apparatus, the beam transformer and the imaging optics are configured to cause a substantially Gaussian beam profile (e.g., 402, FIG. 4A) in the first electromagnetic-field pattern to generate a substantially rectangular beam profile (e.g., 422, FIG. 4C) at the beam-steering surface.

In some embodiments of any of the above apparatus, the beam transformer and the imaging optics are configured to cause a substantially Gaussian beam profile (e.g., 402, FIG. 4A) in the first electromagnetic-field pattern to generate a non-Gaussian beam profile (e.g., 422, FIG. 4C) at the beam-steering surface.

In some embodiments of any of the above apparatus, the beam-steering device comprises a liquid-crystal-on-silicon micro-display.

In some embodiments of any of the above apparatus, the beam-steering device comprises a two-dimensional pixelated MEMS mirror array.

In some embodiments of any of the above apparatus, the beam transformer is configured to perform a non-trivial unitary transform to interconvert the first electromagnetic-field pattern and the second electromagnetic-field pattern, the non-trivial unitary transform having one or more of the following characteristics: (i) causes the first and second electromagnetic-field patterns to have different respective light-intensity distributions, with a difference between the light-intensity distributions being of a type that cannot be obtained solely by magnification/de-magnification or amplification/attenuation, or a combination of magnification/de-magnification and amplification/attenuation; (ii) interconverts into each other a spatially separated set of beams (e.g., 402, FIG. 4A) at the first side of the beam transformer and a spatially orthogonal set of spatially overlapped beams (e.g., 412, FIG. 4B) at the second side of the beam transformer; and (ii) performs the non-trivial unitary transform substantially in a single beam-transverse dimension or substantially differently in two beam-transverse and orthogonal dimensions.

In some embodiments of any of the above apparatus, the beam transformer is configured to interconvert the first beam's electromagnetic-field pattern and the second beam's electromagnetic-field pattern in a manner that causes: a Gaussian beam profile (e.g., 402, FIG. 4A) in the first electromagnetic-field pattern to be converted into a corresponding sinc beam profile (e.g., 412, FIG. 4B) in the second electromagnetic-field pattern for light propagating from the first side to the second side of the beam transformer; and a sinc beam profile (e.g., 412, FIG. 4B) in the second electromagnetic-field pattern to be converted into a corresponding Gaussian beam profile (e.g., 402, FIG. 4A) in the first electromagnetic-field pattern for light propagating from the second side to the first side of the beam transformer.

In some embodiments of any of the above apparatus, the beam transformer is configured to interconvert the first electromagnetic-field pattern and the second electromagnetic-field pattern in a manner that causes a plurality of Gaussian beam profiles (e.g., $402_i$-$402_{10}$, FIG. 4A) in the first electromagnetic-field pattern to be converted into a plurality of mutually orthogonal sinc beam profiles (e.g., $412_1$-$412_{10}$, FIG. 4B) in the second electromagnetic-field pattern for light propagating from the first side to the second side of the beam transformer.

In some embodiments of any of the above apparatus, the beam transformer comprises a planar lightwave circuit (e.g., 500, FIG. 5) having a plurality of waveguides (e.g., 510, FIG. 5), each coupled between the first and second sides of the beam transformer in a manner that causes evanescent field coupling between the waveguides to be a function of a distance from the second side.

In some embodiments of any of the above apparatus, at least one waveguide of the plurality of waveguides has a core size (e.g., w(x), FIG. 5) that changes with the distance.

In some embodiments of any of the above apparatus, at least two waveguides of the plurality of waveguides are spatially separated by a second distance (e.g., $d_2(x)$, FIG. 5) that changes with the distance from the second side.

In some embodiments of any of the above apparatus, the beam transformer comprises one or more optical phase masks interposed between the first side and the second side thereof (e.g., as described in G. Labroille, B. Denolle, P. Jian, et al., "Efficient and Mode Selective Spatial Mode Multiplexer Based on Multi-Plane Light Conversion," OPTICS EXPRESS, 2014, Vol. 22, No. 13, pp. 15599-15607, which is incorporated herein by reference in its entirety).

According to another example embodiment disclosed above in reference to FIGS. 1-7, provided is an apparatus (e.g., 100, FIG. 1; 200, FIG. 2) comprising: an array of optical ports (e.g., $202_1$-$202_P$, FIGS. 2-3); a beam-steering device (e.g., 250, FIG. 2) optically coupled to the array of optical ports and having a beam-steering surface (e.g., 248, FIG. 2); and a beam transformer (e.g., 220, FIG. 2) interposed between the array of optical ports and the beam-steering surface and configured to interconvert a first electromagnetic-field pattern (e.g., $402_1$-$402_{10}$, FIG. 4A) at a first side thereof (e.g., 208, FIG. 2) and a second electromagnetic-field pattern (e.g., $412_1$-$412_{10}$, FIG. 4B) at a second side thereof (e.g., 224, FIG. 2), the first side facing the array of optical ports and the second side facing the beam-steering surface. The beam transformer is configured to interconvert the first electromagnetic-field pattern and the second electromagnetic-field pattern in a manner that causes: a Gaussian beam profile (e.g., 402, FIG. 4A) in the first electromagnetic-field pattern to be converted into a corresponding sinc beam profile (e.g., 412, FIG. 4B) in the second electromagnetic-field pattern for light propagating from the first side to the second side; and a sinc beam profile (e.g., 412, FIG. 4B) in the second electromagnetic-field pattern to be converted into a corresponding Gaussian beam profile (e.g., 402, FIG. 4A) in the first electromagnetic-field pattern for light propagating from the second side to the first side.

In some embodiments of the above apparatus, the beam transformer is configured to interconvert the first electromagnetic-field pattern and the second electromagnetic-field pattern in a manner that causes a plurality of Gaussian beam profiles (e.g., $402_1$-$402_{10}$, FIG. 4A) in the first electromagnetic-field pattern to be converted into a plurality of mutually orthogonal sinc beam profiles (e.g., $412_1$-$412_{10}$, FIG. 4B) in the second electromagnetic-field pattern for the light propagating from the first side to the second side.

In some embodiments of any of the above apparatus, the apparatus further comprises imaging optics (e.g., $230_1$-$230_2$, FIG. 2) interposed between the second side of the beam transformer and the beam-steering surface of the beam-steering device such that the second side of the beam transformer and the beam-steering surface of the beam-steering device are located in different respective Fourier planes of the imaging optics.

In some embodiments of any of the above apparatus, the beam transformer and the imaging optics are configured to cause the Gaussian beam profile in the first electromagnetic-field pattern to generate a substantially rectangular beam profile (e.g., 422, FIG. 4C) at the beam-steering surface.

While this disclosure includes references to illustrative embodiments, this specification is not intended to be construed in a limiting sense.

Although switch 200 (FIG. 2) is described above as having a grating 240 configured to operate in reflection, a person of ordinary skill in the art will understand that alternative embodiments in which grating 240 is configured to operate in transmission are also possible.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

For the purposes of this specification, a MEMS device is a device having two or more parts adapted to move relative (i.e., translate and/or rotate) to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electro-mechanical systems) devices, MOEMS (micro-opto-electro-mechanical systems) devices, micromachines, microsystems, and devices produced using microsystems technology or microsystems integration.

Although the present invention has been described in the context of implementation as MEMS devices, embodiments of the invention can in theory be implemented at any scale, including scales larger than micro-scale.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
    an array of optical ports;
    a beam-steering device optically coupled to the array of optical ports and having a beam-steering surface that comprises a plurality of configurable pixels; and
    a beam transformer interposed between the array of optical ports and the beam-steering surface, wherein the beam transformer comprises a plurality of optical elements optically coupled to each other and located between a first side of the beam transformer and a second side of the beam transformer and configured to interconvert a first electromagnetic-field pattern of the first side and a second electromagnetic-field pattern of the second side, the first side facing the array of optical ports and the second side facing the beam-steering surface; and
    wherein the plurality of optical elements are further configured to cause the first electromagnetic-field pattern and the second electromagnetic-field pattern to have different relative amounts of spatial overlap between optical beams corresponding to at least one pair of optical ports of the array of optical ports.

2. The apparatus of claim 1, further comprising a wavelength-selective optical router, wherein the array of optical ports, the beam-steering device, and the beam transformer are parts of said wavelength-selective optical router.

3. The apparatus of claim 1, further comprising a diffraction grating interposed between the beam transformer and the beam-steering surface.

4. The apparatus of claim 3, wherein the plurality of configurable pixels are configurable to individually steer beams corresponding to different carrier wavelengths spectrally dispersed by the diffraction grating to enable the apparatus to route any of the carrier wavelengths between a first optical port of the array and any second optical port of a plurality of second optical ports of the array, the first optical port being a common port of a wavelength-selective optical router.

5. The apparatus of claim 1, further comprising imaging optics interposed between the second side of the beam transformer and the beam-steering surface of the beam-steering device such that the second side of the beam transformer and the beam-steering surface of the beam-steering device are located in different respective Fourier planes of the imaging optics.

6. The apparatus of claim 5, wherein the beam transformer and the imaging optics are configured to cause an inter-conversion between a light beam having a first lateral profile and a light beam having a second lateral profile, the first and second lateral profiles characterized by different respective amounts of relative optical power contained within respective FWHM areas thereof.

7. The apparatus of claim 6, wherein the beam transformer and the imaging optics are configured to cause the different respective amounts of the relative optical power to differ by at least 4%.

8. The apparatus of claim 5, wherein:
the beam transformer and the imaging optics are configured to cause an inter-conversion between a light beam having a first lateral profile and a light beam having a second lateral profile;
a magnitude of an electric field at some coordinates within a beam area corresponding to 0.45FWHM of the first lateral profile is lower than 60% of a maximum magnitude of the first lateral profile; and
a magnitude of an electric field at any coordinate within a beam area corresponding to 0.45FWHM of the second lateral profile is at least 70% of a maximum magnitude of the second lateral profile .

9. The apparatus of claim 5, wherein the beam transformer and the imaging optics are configured to cause an inter-conversion between a light beam with a substantially Gaussian lateral profile and a light beam with a substantially rectangular lateral profile.

10. The apparatus of claim 5, wherein the beam transformer and the imaging optics are configured to cause an inter-conversion between a light beam with a substantially Gaussian lateral profile and a light beam with a non-Gaussian lateral profile.

11. The apparatus of claim 1, wherein the plurality of configurable pixels comprise pixels of a liquid-crystal-on-silicon micro-display.

12. The apparatus of claim 1, wherein the plurality of configurable pixels comprise a plurality of mirrors of a two-dimensional MEMS mirror array.

13. The apparatus of claim 1, wherein the beam transformer is configured to perform one or both of:
(i) changing a percentage of spatial overlap between nearest-neighbor ones of the optical beams; and
(ii) changing a circularity of a profile of one or more of the optical beams.

14. The apparatus of claim 1, wherein the plurality of optical elements include a plurality of waveguides of a planar lightwave circuit, each of the waveguides being coupled between the first and second sides of the beam transformer in a manner that causes evanescent field coupling between the waveguides to be a function of a distance from the second side.

15. The apparatus of claim 1, wherein the plurality of optical elements include a plurality of optical phase masks interposed between the first side and the second side.

16. An apparatus comprising:
an array of optical ports;
a beam-steering device optically coupled to the array of optical ports and having a beam-steering surface; and
a beam transformer interposed between the array of optical ports and the beam-steering surface and configured to interconvert a first light beam pattern that includes a collection of substantially Gaussian beam profiles at a first side thereof and a second light beam pattern at a second side thereof, the first side facing the array of optical ports and the second side facing the beam-steering surface;
wherein the beam transformer is further configured to cause an inter-conversion between the collection of substantially Gaussian beam profiles at the first side and a collection of substantially rectangular beam profiles at the beam-steering device by way of the second light beam pattern at the second side; and
wherein the beam transformer is configured to interconvert between the first and second light beam patterns in a manner that substantially changes spatial overlaps between nearest neighbor ones of the light beams.

17. The apparatus of claim 16, wherein the second light beam pattern includes a plurality of substantially sinc beam profiles.

18. The apparatus of claim 16, further comprising imaging optics interposed between the second side of the beam transformer and the beam-steering surface of the beam-steering device such that the second side of the beam transformer and the beam-steering surface of the beam-steering device are located in different respective Fourier planes of the imaging optics.

* * * * *